(12) United States Patent
Iinuma et al.

(10) Patent No.: US 11,256,158 B2
(45) Date of Patent: Feb. 22, 2022

(54) CONTROL DEVICE, OUTPUT DEVICE, IMAGING DEVICE, CONTROL METHOD AND PROGRAM

(71) Applicant: SZ DJI TECHNOLOGY CO., LTD., Shenzhen (CN)

(72) Inventors: Futoshi Iinuma, Tokyo (JP); Tatsuya Nakatsuji, Tokyo (JP); Toshiaki Yamada, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/200,765

(22) Filed: Mar. 12, 2021

(65) Prior Publication Data

US 2021/0200059 A1 Jul. 1, 2021

Related U.S. Application Data

(63) Continuation of application No. PCT/CN2019/105146, filed on Sep. 10, 2019.

(30) Foreign Application Priority Data

Sep. 28, 2018 (JP) .............................. JP2018-184738

(51) Int. Cl.
*G03B 7/18* (2021.01)
*G02B 5/20* (2006.01)
(Continued)

(52) U.S. Cl.
CPC ............... *G03B 7/18* (2013.01); *G02B 5/205* (2013.01); *G03B 11/00* (2013.01); *G03B 17/14* (2013.01); *H04N 5/2254* (2013.01); *H04N 5/238* (2013.01)

(58) Field of Classification Search
CPC .......... G03B 7/18; G03B 11/00; G03B 17/14; G02B 5/205; H04N 5/2254
See application file for complete search history.

(56) References Cited

U.S. PATENT DOCUMENTS 4,661,692 A * 4/1987 Kawasaki ............ G02B 21/244
250/201.2
4,918,470 A 4/1990 Whiteside
(Continued)

FOREIGN PATENT DOCUMENTS

CN 101377605 A 3/2009
CN 204422841 U 6/2015
(Continued)

OTHER PUBLICATIONS

The World Intellectual Property Organization (WIPO) International Search Report for PCT/CN2019/105146 dated Dec. 13, 2019 6 Pages (including translation).

*Primary Examiner* — Christopher E Mahoney
(74) *Attorney, Agent, or Firm* — Anova Law Group, PLLC

(57) ABSTRACT

A control device includes a memory storing instructions, and a processor configured to execute the instructions to obtain transmittance information related to transmittances of a plurality of neutral-density filters of an imaging device, receive a target transmittance, select at least one neutral-density filter of the plurality of neutral-density filters to achieve the target transmittance according to priority information related to a predetermined priority order of the plurality of neutral-density filters and the transmittance information of the at least one neutral-density filter, and control the at least one neutral-density filter to be in an effective state.

20 Claims, 18 Drawing Sheets

(51) Int. Cl.
*G03B 11/00* (2021.01)
*G03B 17/14* (2021.01)
*H04N 5/225* (2006.01)
*H04N 5/238* (2006.01)

(56) References Cited

U.S. PATENT DOCUMENTS

| | | | | |
|---|---|---|---|---|
| 2009/0102918 | A1* | 4/2009 | Sakamoto | G01N 21/6458 |
| | | | | 348/79 |
| 2015/0070563 | A1* | 3/2015 | Sperber | G02B 7/006 |
| | | | | 348/342 |
| 2020/0412962 | A1* | 12/2020 | Yamauchi | H04N 5/23296 |

FOREIGN PATENT DOCUMENTS

| | | |
|---|---|---|
| CN | 204925437 U | 12/2015 |
| CN | 108153083 A | 6/2018 |
| CN | 207817385 U | 9/2018 |
| JP | H0622208 A | 1/1994 |
| JP | H09219815 A | 8/1997 |
| JP | H09331474 A | 12/1997 |
| JP | 2002174551 A | 6/2002 |
| JP | 2007174567 A | 7/2007 |
| JP | 2009086133 A | 4/2009 |
| JP | 2013054123 A | 3/2013 |
| JP | 2013092609 A | 5/2013 |
| JP | 2015055689 A | 3/2015 |
| JP | 2015118220 A | 6/2015 |
| JP | 2015122780 A | 7/2015 |
| WO | 2013054728 A1 | 4/2013 |
| WO | 2014010672 A1 | 1/2014 |

* cited by examiner

|  | Driving speed (s) | Distance from a shooting surface |
|---|---|---|
| ND filter of a lens unit | 0.05 | 50 mm |
| Adapter (variable ND filter) | 0.5 | 17 mm |
| ND filter of an imaging unit | 0.7 | 4 mm |

CONTROL DEVICE, OUTPUT DEVICE, IMAGING DEVICE, CONTROL METHOD AND PROGRAM

CROSS-REFERENCE TO RELATED APPLICATIONS

This application is a continuation of International Application No. PCT/CN2019/105146, filed Sep. 10, 2019, which claims priority to Japanese Patent Application No. 2018-184738, filed Sep. 28, 2018, the entire contents of both of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a control device, an output device, an imaging device, a control method, and a program.

BACKGROUND

Patent document 1 discloses a combination of a camera-side neutral-density (ND) filter and a lens-side ND filter. Patent document 1: Japanese Patent Application Publication No. 2013-54123.

SUMMARY

In accordance with the disclosure, there is provided a control device including a memory storing instructions, and a processor configured to execute the instructions to obtain transmittance information related to transmittances of a plurality of neutral-density filters of an imaging device, receive a target transmittance, select at least one neutral-density filter of the plurality of neutral-density filters to achieve the target transmittance according to priority information related to a predetermined priority order of the plurality of neutral-density filters and the transmittance information of the at least one neutral-density filter, and control the at least one neutral-density filter to be in an effective state.

Also in accordance with the disclosure, there is provided an imaging device including a lens unit, a main body used to hold the lens unit, and a control device. The control device includes a memory storing instructions, and a processor configured to execute the instructions to obtain transmittance information related to transmittances of a plurality of neutral-density filters of an imaging device, receive a target transmittance, select at least one neutral-density filter of the plurality of neutral-density filters to achieve the target transmittance according to priority information related to a predetermined priority order of the plurality of neutral-density filters and the transmittance information of the at least one neutral-density filter, and control the at least one neutral-density filter to be in an effective state.

Also in accordance with the disclosure, there is provided a control method including obtaining transmittance information related to transmittances of a plurality of neutral-density filters of an imaging device, receiving a target transmittance, selecting at least one neutral-density filter of the plurality of neutral-density filters to achieve the target transmittance according to priority information related to a predetermined priority order of the plurality of neutral-density filters and the transmittance information of the at least one neutral-density filter, and controlling the at least one neutral-density filter to be in an effective state.

Figure 1:
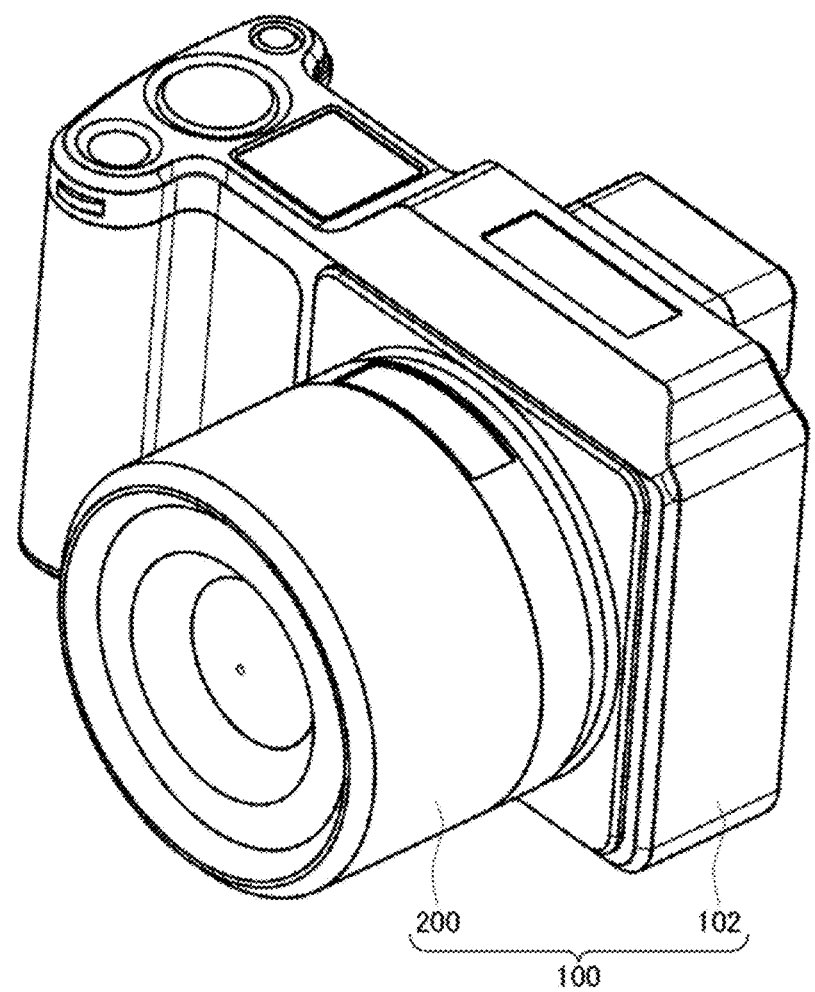
FIG. 1 is a perspective view of an imaging device consistent with embodiments of the disclosure.

Reference numerals: Imaging device 100; Imaging unit 102; Imaging controller 110; Obtaining circuit 111; Reception circuit 112; Selection circuit 113; ND filter controller 114; Determination circuit 115; Output circuit 116; Image sensor 120; Memory 130; Switching controller 132; Mechanical ND filter 140; Motor 141; Spur gear 142; Rack 143; Guide shaft 144; ND filter 147,149; Variable ND filter 150; Transparent glass 148; Motor 151; Spur gear 152; Rack 153; Guide shaft 154; Motor 156; Spur gear 157; Rack 158; Guide shaft 159; Display 160; Instruction device 162; Voltage adjuster 164; Detection switch 166; Motor 171; Spur gear 172; Rack 173; Guide shaft 174; Lens mount opening 180; Lens unit 200; Focus lens 210; Zoom lens 211; Lens driver 212, 213; Position sensor 214, 215; Electric motor 216, 217; Lens controller 220; Memory 222; Magnetic ND filter 250; Rotation axis 251; Coil 252; Magnet 253; Computer 1200; Host controller 1210; CPU 1212; RAM 1214; Input/output controller 1220; Communication interface 1222; ROM 1230.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The embodiments of the present disclosure will be described with reference to the flow charts and block diagrams. As used herein, the blocks may represent operation processes or components of the device that perform operations. The specific processes and components may be implemented by programmable circuits and/or processors. The circuits may include digital and/or analog hardware circuits, may include integrated circuits (ICs) and/or discrete circuits. The programmable circuits may include reconfigurable hardware circuits. The reconfigurable hardware circuits may include logical operations, such as the logical operation AND, the logical operation OR, the logical operation XOR, the logical operation NAND, and the logical operation NOR, etc. The reconfigurable hardware circuits may also include storage elements, such as flip-flops, registers, field programmable gate arrays (FPGAs), and programmable logic arrays (PLAs), etc.

The operations specified in the flow chart or block diagram may be implemented in the form of program instructions stored on a computer-readable storage medium, which may be sold or used as a standalone product. The computer-readable storage medium may be any suitable device that may store program instructions, which may include an electronic storage medium, a magnetic storage medium, an optic storage medium, an electromagnetic storage medium, and a semiconductor storage medium, etc. The computer-readable storage medium may be, for example, a Floppy® disk, a soft disk, a hard disk, a random-access memory (RAM), a read-only memory (ROM), an erasable programmable read-only memory (EPROM or flash memory), an electrically erasable programmable read-only memory (EEPROM), a static random-access memory (SRAM), a compact disc read-only memory (CD-ROM), a digital versatile disc (DVD), a Blu-ray disc, a memory stick, or an integrated circuit chip, etc.

The computer-readable instructions may include any one of source code or object code described in any combination of one or more programming languages. The source code or the object code includes traditional procedural programming languages. The traditional programming language may be assembly instructions, instruction set architecture (ISA) instructions, machine instructions, machine-related instructions, microcode, firmware instructions, status setting data, an object programming language, e.g., Smalltalk, JAVA (registered trademark), or C++, etc., or "C" programming language. The computer-readable instructions may be provided locally or provided to a processor or a programmable circuit of a general-purpose computer, a special-purpose computer, or another programmable data processing device via a wide area network (WAN), e.g., a local area network (LAN), or the Internet. The processor or the programmable circuit may execute computer-readable instructions to perform the operations specified in the flow chart or block diagram. The processor may be a computer processor, a processing unit, a microprocessor, a digital signal processor, a controller, or a microcontroller, etc.

Figure 2:
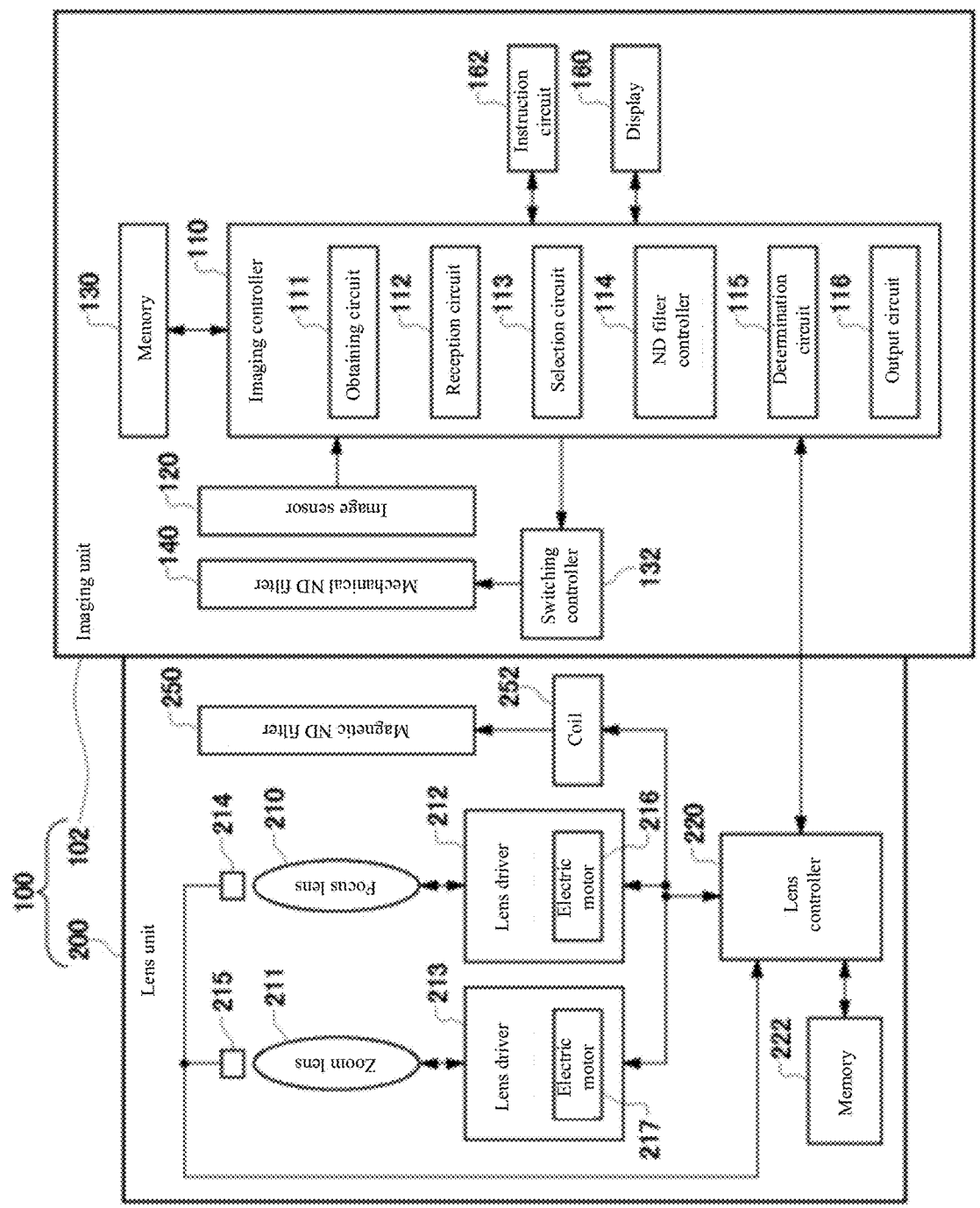
FIG. 2 is a schematic functional block diagram of an example imaging device.

FIG. 1 is a perspective view of an imaging device 100 consistent with embodiments of the disclosure. FIG. 2 is a schematic functional block diagram of the imaging device 100.

The imaging device 100 includes an imaging unit 102 and a lens unit 200. The imaging unit 102 includes an image sensor 120, an imaging controller 110, and a memory 130. The image sensor 120 may include a charge coupled device (CCD) or a complementary metal oxide semiconductor (CMOS). The image sensor 120 outputs image data of the optic image formed by the zoom lens 211 and the focus lens 210 to the imaging controller 110. The imaging controller 110 may include the microprocessor, e.g., a central processing unit (CPU) or a microprocessor unit (MPU), or a microcontroller, e.g., a microprogrammed control unit (MCU), etc. The memory 130 may be the computer-readable storage medium and may include at least one of an SRAM, a dynamic random-access memory (DRAM), an EPROM, an EEPROM, or a flash memory such as a USB memory. The memory 130 stores a program for the imaging controller 110 to control the image sensor 120, etc. The memory 130 may be provided inside a casing of the imaging device 100. The memory 130 may be detachably mounted at the casing of the imaging device 100.

The imaging unit 102 further includes an instruction device 162 and a display 160. The instruction device 162 is a user interface receiving an instruction to the imaging device 100 from a user. The display 160 displays an image captured by the image sensor 120, various setting information of the imaging device 100, and etc. The display 160 may include a touch panel.

The imaging unit 102 may further include a mechanical neutral-density (ND) filter 140 and a switching controller 132. The mechanical ND filter 140 includes at least one ND filter. The mechanical ND filter 140 is controlled by the switching controller 132 to mechanically switch the ND filter.

Figure 3A:
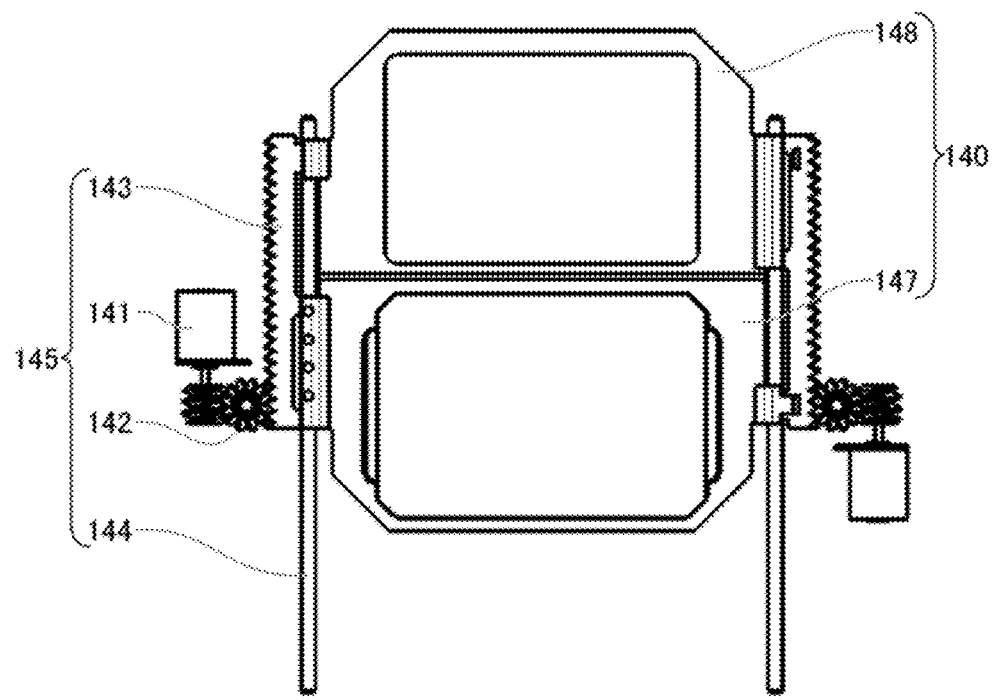
FIG. 3A is a schematic diagram of an example mechanical neutral-density (ND) filter.
Figure 3B:
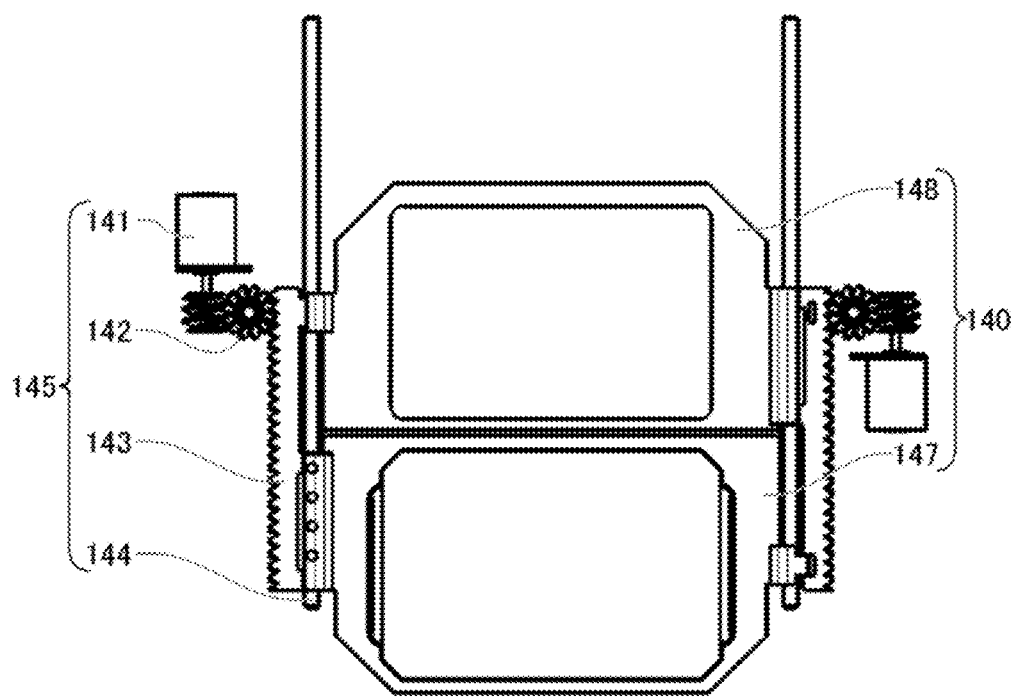
FIG. 3B is a schematic diagram of an example mechanical ND filter

FIG. 3A and FIG. 3B show an example mechanical ND filter 140. The mechanical ND filter 140 includes, for example, an ND filter 147 with an ND number of ND4 and a transparent glass 148. The ND filter 147 and the transparent glass 148 are fixed to a rack 143 and are supported in a manner of being slidable along a guide shaft 144 with the rack 143. The power from the motor 141 is transmitted to the rack 143 via the spur gear 142, and the ND filter 147 and the transparent glass 148 slide along the guide shaft 144. FIG. 3A shows a state where the ND filter 147 is arranged at an optical path. FIG. 3B shows a state where the transparent glass 148 is arranged at the optical path. In addition, if the transparent glass 148 is not arranged at the optical path, an optical path length of a flange focal distance changes. To prevent such a change, the transparent glass 148 is arranged at the optical path even when an amount of light is not reduced by the ND filter.

The lens unit 200 includes a focus lens 210, a zoom lens 211, a lens driver 212, a lens driver 213, and a lens controller 220. The focus lens 210 and the zoom lens 211 may include at least one lens. At least some or all of the focus lens 210 and the zoom lens 211 are configured to be movable along an optic axis. The lens unit 200 may be an interchangeable lens detachable attached to the imaging unit 102. The lens driver 212 includes an electric motor 216. The electric motor 216 may be a step motor, a direct current (DC) motor, a coreless motor, or an ultrasonic motor. The lens driver 212 transmits the power from the electric motor 216 to at least a part or all of the focus lens 210 via mechanical members, such as a cam ring and the guide shaft, to enable the at least a part or all of the focus lens 210 to move along the optic axis. The lens driver 213 includes the electric motor 217. The electric motor 217 may be the step motor, the DC motor, the coreless motor, or the ultrasonic motor. The lens driver 213 transmits the power from the electric motor 217 to at least a part or all of the zoom lens 211 via the mechanism members, such as the cam ring and the guide shaft, to enable the at least a part or all of the zoom lens 211 to move along the optic axis. The lens controller 220 drives at least one of the lens driver 212 or the lens driver 213 according to a lens controller instruction from the imaging unit 102, and enables at least one of the focus lens 210 or the zoom lens 211 to move along the optic axis via the mechanism member, to perform at least one of zooming or focusing. The lens controller instruction is, for example, a zoom control instruction or a focus control instruction.

The lens unit 200 also includes a memory 222, a position sensor 214, and a position sensor 215. The memory 222 stores control values for controlling the focus lens 210 and the zoom lens 211 to move via the lens driver 212 and the lens driver 213. The memory 222 may include the at least one of an SRAM, a DRAM, an EPROM, an EEPROM, or a flash memory such as a USB memory. The position sensor 214 detects a position of the focus lens 210. The position sensor 214 may detect a current focus position. The position sensor 215 detects the position of the zoom lens 211. The position sensor 215 may detect a current zoom position of the zoom lens 211. The position sensor 214 and the position sensor 215 may be magnetoresistive (MR) sensors.

Figure 4A:
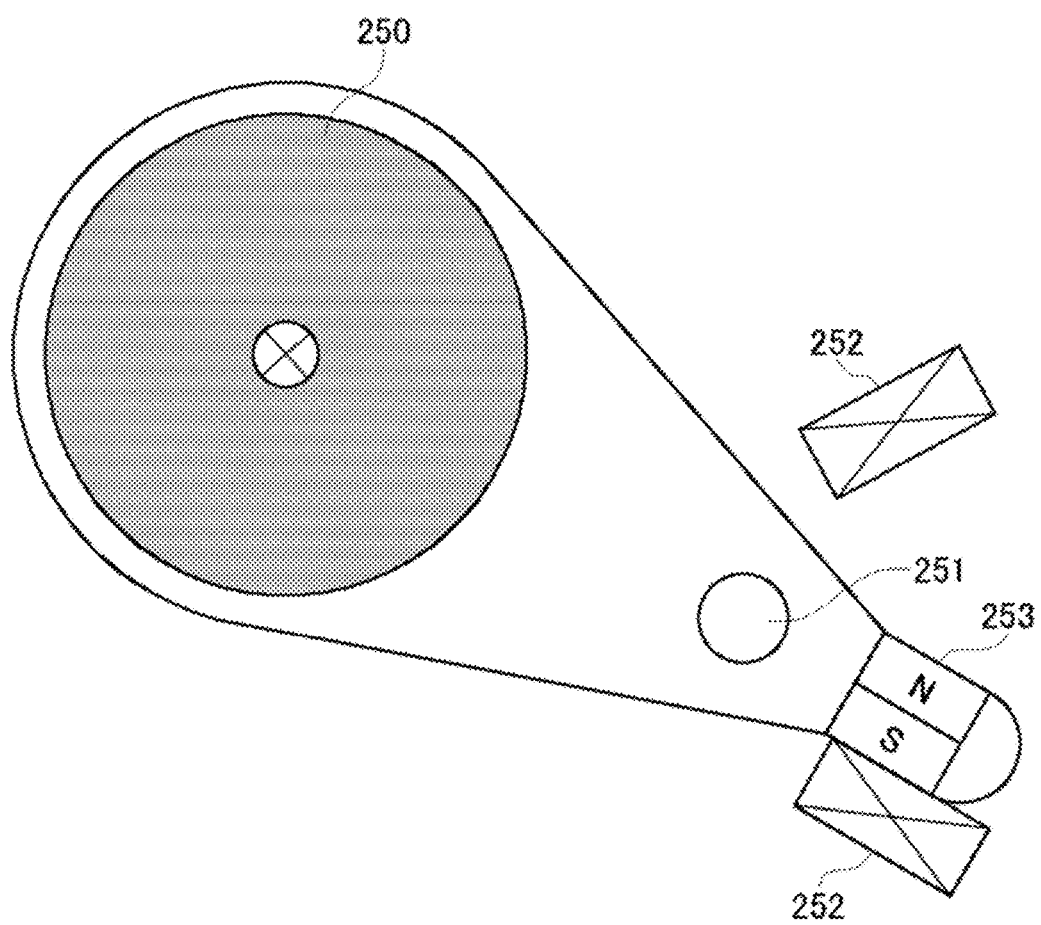
FIG. 4A is a schematic diagram of an example magnetic ND filter.
Figure 4B:
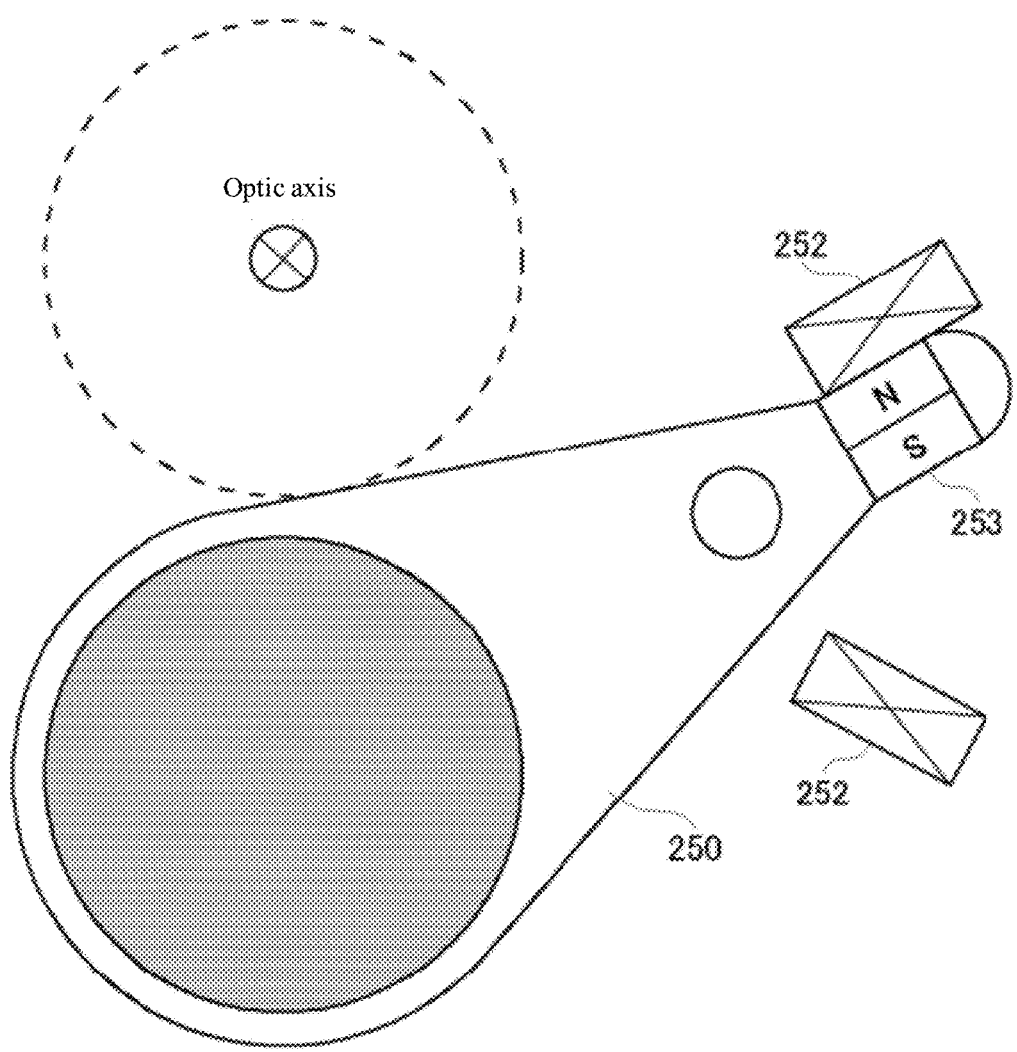
FIG. 4B is a schematic diagram of an example magnetic ND filter.

The lens unit 200 further includes a magnetic ND filter 250 and a coil 252. The magnetic ND filter 250 is an example of the ND filter. FIG. 4A and FIG. 4B show an example magnetic ND filter 250. The magnetic ND filter 250 may rotate around a rotation axis 251. The magnetic ND filter 250 includes a magnet 253 at one end. Electric current flows through at least one of the two coils 252 to generate a magnetic field. The magnet 253 is attracted by one coil 252, and the magnetic ND filter 250 rotates around the rotation axis 251. The magnetic ND filter may be arranged at or removed from the optical path by switching s direction of the current flowing through the coil 252 or switching the coil 252 through which the current flows. FIG. 4A shows a state where the magnetic ND filter 250 is arranged at the optical path. FIG. 4B shows a state where the magnetic ND filter 250 is removed from the optical path.

The above-described imaging device 100 improves convenience when a plurality of ND filters used as a combination.

The imaging controller 110 includes an obtaining circuit 111, a reception circuit 112, a selection circuit 113, an ND filter controller 114, a determination circuit 115, and an output circuit 116.

The obtaining circuit 111 acquires information indicating each ND number as the information related to transmittances of the plurality of ND filters included in the imaging device 100. The obtaining circuit 111 may acquire the information indicating the transmittance or optic density (OD) instead of the information indicating the ND number. The memory 222 of the lens unit 200 stores the ND number of the ND filter included in the lens unit 200. The memory 222 stores the ND number settable by the magnetic ND filter 250. The memory 130 of the imaging unit 102 stores the ND number of the ND filter included in the imaging unit 102. The memory 130 stores the ND number settable by the mechanical ND filter 140. The obtaining circuit 111 acquires the ND numbers settable by the lens unit 200 and the imaging unit 102, respectively, from the memory 222 and the memory 130.

The reception circuit 112 receives the target ND number via the instruction device 162. The selection circuit 113 selects the at least one ND filter of the plurality of ND filters to achieve the target ND number received by the reception circuit 112 according to the information indicating a predetermined priority order of the plurality of ND filters and the information indicating the ND number of the at least one ND filter.

The ND filter controller 114 controls the plurality of ND filters to cause the at least one ND filter selected by the selection circuit 113 to be in an effective state. That is, the ND filter controller 114 drives the mechanical ND filter 140 via the switching controller 132 to cause the target ND filter to be in the effective state. The target ND filter is the at least one ND filter to achieve the target ND number received by the reception circuit 112. The ND filter controller 114 drives the mechanical ND filter 140 via the switching controller 132, to cause the target ND filter to be arranged at the optical path. In some embodiments, the ND filter controller 114 drives the magnetic ND filter 250 via the lens controller 220, to cause the target ND filter to be in the effective state.

The selection circuit 113 selects an ND filter with a faster switching speed from the plurality of ND filters as the target ND filter, according to the information indicating the predetermined priority order and the information indicating the ND number of the at least one ND filter. The switching speed of the ND filter of the magnetic ND filter 250 is faster than the switching speed of the ND filter of the mechanical ND filter 140. Therefore, when the ND number received by the reception circuit 112 can be set by either the magnetic ND filter 250 or the mechanical ND filter 140, the selection circuit 113 may select the magnetic ND filter 250 rather than the mechanical ND filter 140.

The selection circuit 113 selects the at least one ND filter that can achieve the ND number received by the reception circuit 112 with fewer ND filters of the plurality of ND filters, according to the information indicating the predetermined priority order and the information indicating the ND number of the at least one ND filter. For example, the ND number settable by the magnetic ND filter 250 is ND4, and the ND number settable by the mechanical ND filter 140 is ND8 or ND32. Then, when the ND number received by the reception circuit 112 is ND32, the ND filter of ND4 of the magnetic ND filter 250 and the ND filter of ND8 of the mechanical ND filter 140 are arranged to be in the effective state to achieve ND32. Alternatively, the ND number of ND32 can be achieved by setting only the ND filter of ND32 of the mechanical ND filter 140 to be in the effective state. Thus, the selection circuit 113 selects the ND filter of ND32 of the mechanical ND filter 140 to achieve ND32 with fewer ND filters.

The selection circuit 113 may also select the ND filter farther from the image sensor 120 as the at least one ND filter to achieve the ND number received by the reception circuit 112, according to the information indicating the predetermined priority order and the information indicating the ND number of the at least one ND filter. The ND filter close to an imaging surface of the image sensor 120 may transmit the converged light, which may adversely affect imaging of the image sensor 120. Therefore, the selection circuit 113 may also select the ND filter farther from the image sensor 120. For example, when the ND number received by the reception circuit 112 can be set by the mechanical ND filter 140 or the magnetic ND filter 250, the selection circuit 113 may select the magnetic ND filter 250 farther from the image sensor 120.

In addition to the mechanical ND filter 140 and the magnetic ND filter 250, the imaging device 100 may also include an electronic variable ND filter configured with a variable transmittance within a predetermined range. In such a case, the selection circuit 113 may select the variable ND filter.

The selection circuit 113 may also select at least another one ND filter to achieve another ND number higher than the target ND number (i.e., another transmittance lower than a target transmittance corresponding to the target ND number) received by the reception circuit 112, according to the information indicating the predetermined priority order of the plurality of ND filters and the information indicating the ND number of the at least one ND filter. Then, the ND filter controller 114 may control the plurality of ND filters to switch the at least one ND filter to be in the effective state after the at least another one ND filter to achieve a higher ND number selected by the selection circuit 113 is in the effective state. Therefore, a sense of disharmony caused by the switching of the ND filter for the user who views a preview screen displayed on the display 160 may be reduced.

An adapting speed to light is faster than the adapting speed to dark. That is, compared with watching a switch from a bright picture to a dark picture, when watching the switch from the dark picture to the bright picture, humans become accustomed to the brightness of the screen faster. Therefore, the ND filter controller 114 temporarily arranges the ND filter to achieve the ND number higher than the target ND number to darken the preview screen displayed by the display 160, and then arranges the ND filter to achieve the target ND number. Therefore, the sense of disharmony caused by the switching of the ND filter for the user may be reduced.

Figure 5:
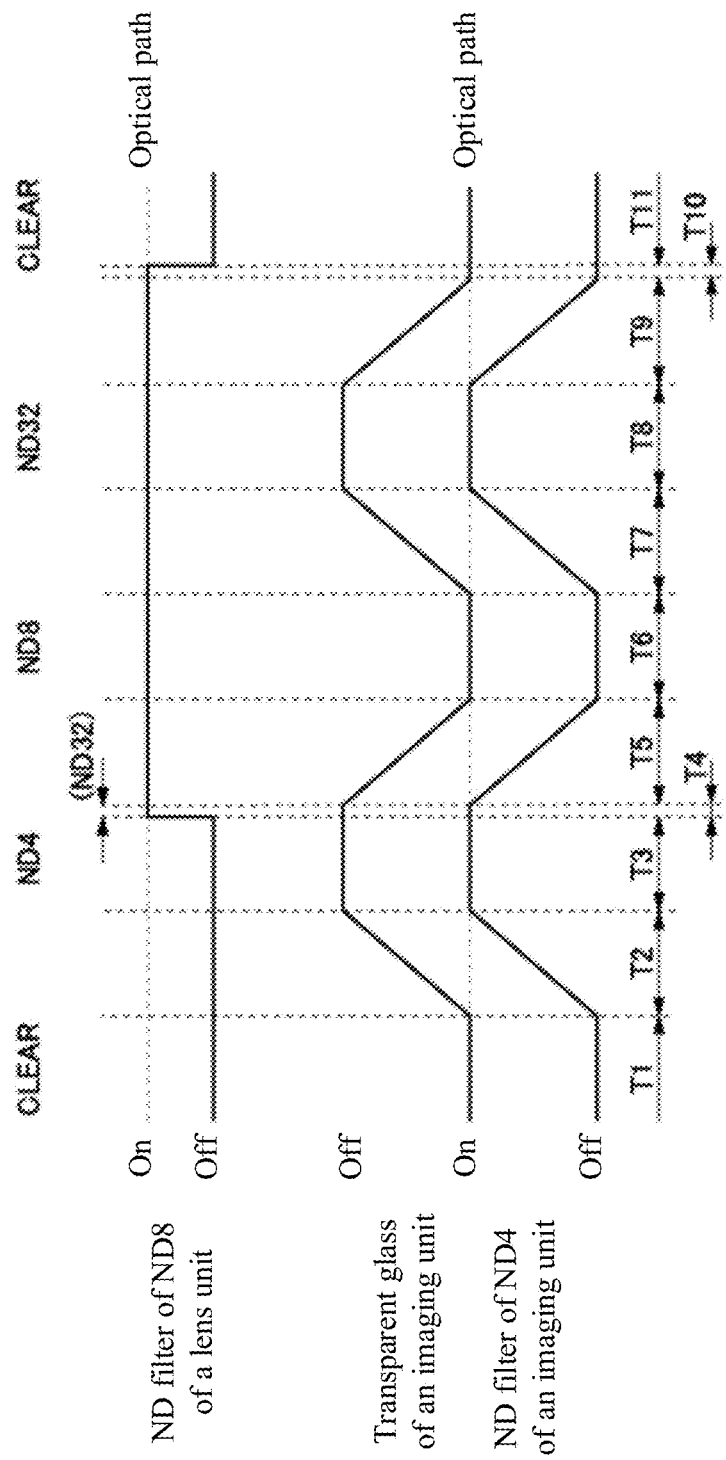
FIG. 5 is a schematic diagram showing an example of ND filter switch timing.

FIG. 5 is a schematic diagram of an example switch timing of an ND filter. In the period T1, the transparent glass 148 of the mechanical ND filter 140 is arranged at the optical path. In the period T2, the mechanical ND filter 140 is driven, and the filter arranged at the optical path is switched from the transparent glass 148 to the ND filter 147 of ND4. In the period T3, the ND number is ND4. When ND8 is received as the target ND number, first, in the period T4, the magnetic ND filter 250 is driven, and the ND8 filter is also arranged at the optical path. Therefore, in the period T4, the ND number of the imaging device 100 temporarily becomes ND32. Then, in the period T5, the mechanical ND filter 140 is driven, and the filter arranged at the optical path is switched from the ND filter 147 of ND4 to the transparent glass 148. Therefore, in the period T6, the ND number of the imaging device 100 is ND8. When ND32 is received as the target ND number, in the period T7, the mechanical ND filter 140 is driven, and the filter arranged at the optical path is switched from the transparent glass 148 to the ND filter 147 of ND4. Therefore, in the period T8, the ND number of the imaging device 100 is ND32 again. Then, if the target ND number is 0, that is, to release the ND filter, then in the period T9, the mechanical ND filter 140 is driven. In the period T10, the filter arranged at the optical path is switched from the ND filter 147 of ND4 to the transparent glass 148. Furthermore, in the period T10, the magnetic ND filter 250 is driven, and the ND filter is removed from the optical path. Therefore, in the period T11, all the ND filters of the imaging device 100 are removed from the optical path. That is, all the ND filters of the imaging device 100 are in the ineffective state.

Figure 6:
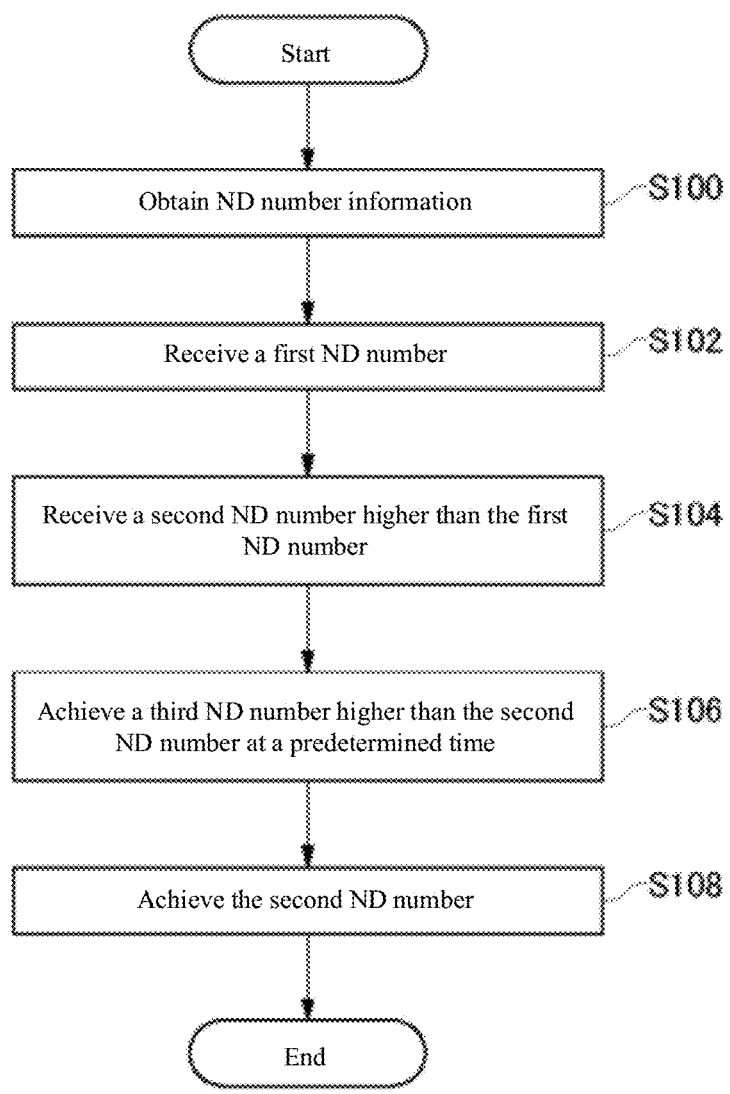
FIG. 6 is a schematic flow chart of an ND filter switching process according to an example embodiment.

FIG. 6 is a schematic flow chart of an ND filter switching process according to an example embodiment. When receiving an ND number reading request, the obtaining circuit 111 obtains settable ND number information from the memory 130 and the memory 222 (S100). The reception circuit 112 receives a first ND number (S102). For example, the ND filter controller 114 drives the mechanical ND filter 140 to achieve ND4. Then, the reception circuit 112 receives a second ND number higher than the first ND number (S104). For example, the reception circuit 112 receives ND8. In this case, the ND filter controller 114 drives the at least one of the mechanical ND filter 140 or the magnetic ND filter 250 to achieve a third ND number higher than the second ND number at a predetermined time before setting ND8 (S106). For example, the ND filter controller 114 drives the magnetic ND filter 250 to cause the ND filter of ND8 to be in the effective state before the ND filter of ND4 of the mechanical ND filter 140 is released. Thus, the ND number of the imaging device 100 is temporarily ND32. Then, the ND filter controller 114 drives the at least one of the mechanical ND filter 140 or the magnetic ND filter 250 to achieve the second ND number (S108). For example, the ND filter controller 114 drives the mechanical ND filter 140 to cause the transparent glass 148 to be in the effective state. Therefore, only the ND filter of ND8 of the magnetic ND filter 250 is in the effective state. Thus, the ND number of the imaging device 100 is ND8.

As described above, when it is possible to set an ND number higher than the target ND number, the ND number is temporarily set to the higher ND number and then set to the target ND number. Thus, for example, the sense of disobedience for the user who views the preview screen may be reduced.

Figure 7A:
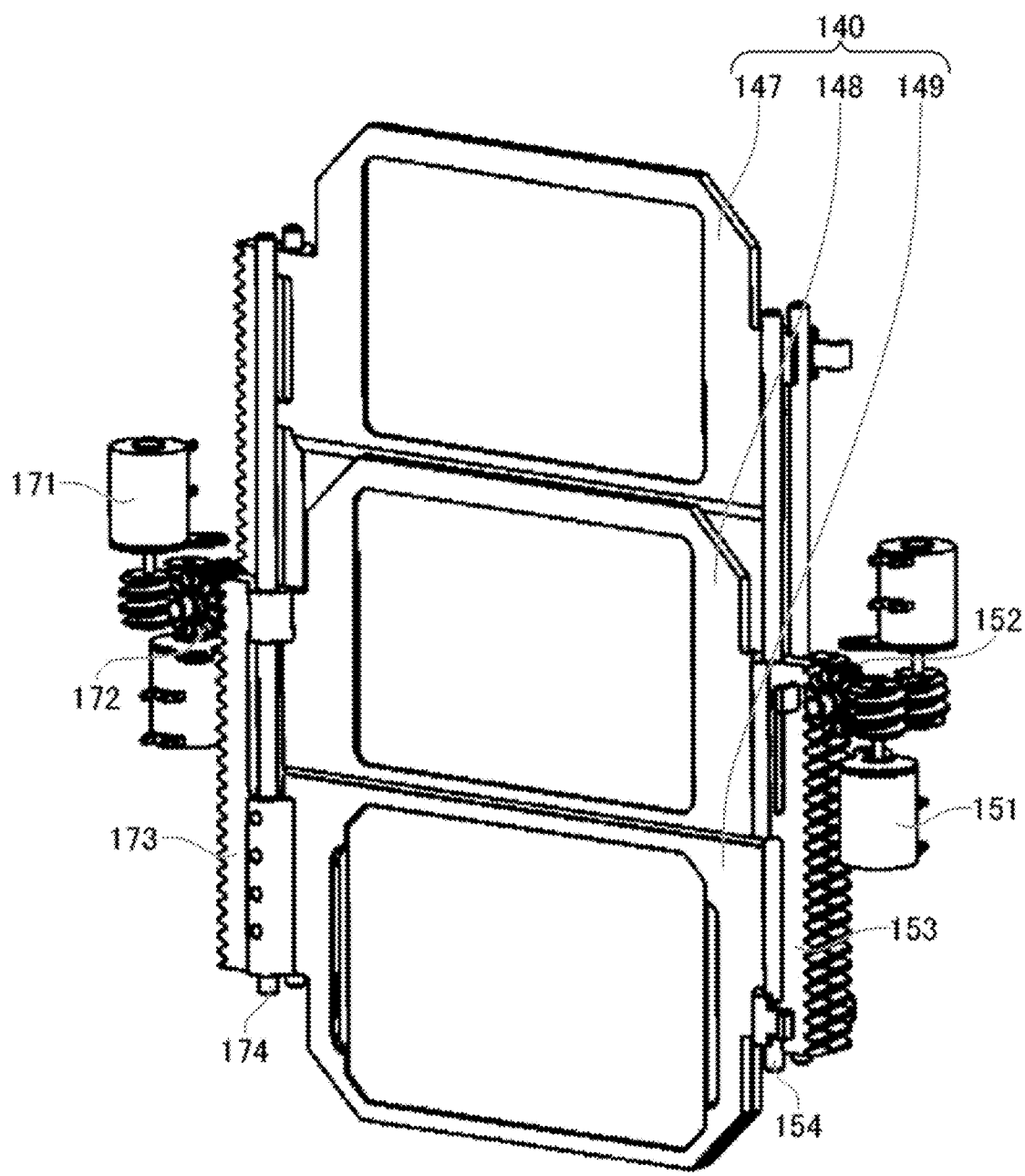
FIG. 7A is a schematic diagram of an example mechanical ND filter.
Figure 7B:
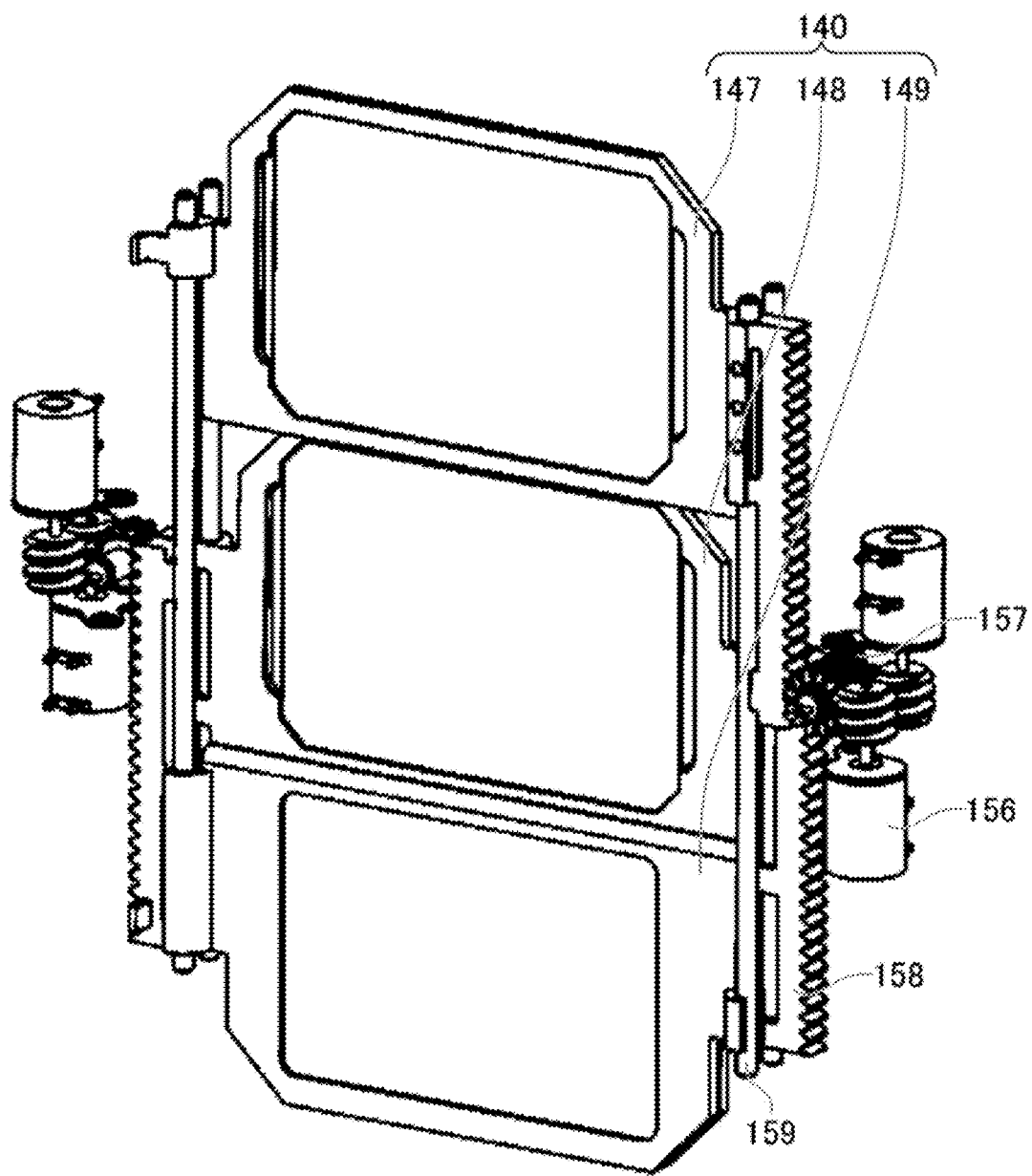
FIG. 7B is a schematic diagram of an example mechanical ND filter.

FIG. 7A and FIG. 7B show another example of the mechanical ND filter 140. FIG. 7A is a front perspective view of the mechanical ND filter 140, and FIG. 7B is a rear perspective view of the mechanical ND filter 140. The mechanical ND filter 140 includes the ND filter 147 of ND4, the transparent glass 148, and the ND filter 149 of ND16.

The transparent glass 148 is fixed to the rack 153 and is supported in a manner of being slidable along the guide shaft 154 with the rack 153. The power from the motor 151 is transmitted to the rack 153 via the spur gear 152, and the transparent glass 148 slides along the guide shaft 154. The ND filter 149 is fixed to the rack 173 and is supported in a manner of being slidable along the guide shaft 174 with the rack 173. The power from the motor 171 is transmitted to the rack 173 via the spur gear 172, and the ND filter 149 slides along the guide shaft 174. The ND filter 147 is fixed to the rack 158 and is supported in a manner of being slidable along the guide shaft 159 with the rack 158. The power from the motor 156 is transmitted to the rack 158 via the spur gear 157, and the ND filter 147 slides along the guide shaft 159.

Figure 8:
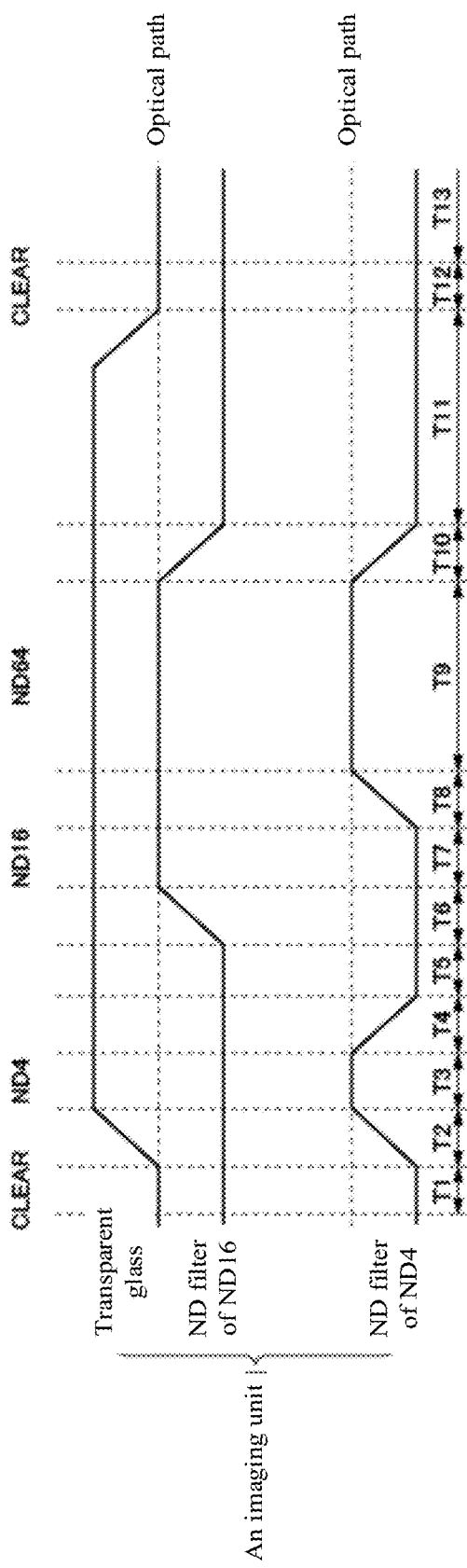
FIG. 8 is a schematic diagram showing an example of ND filter switch timing.

FIG. 8 is a schematic diagram showing an example of ND filter switch timing. In the period T1, the transparent glass 148 is arranged at the optical path. The reception circuit 112 receives ND4 as the target ND number. In the period T2, the ND filter controller 114 drives the mechanical ND filter 140 to remove the transparent glass 148 from the optical path, and to arrange the ND filter 147 of ND4 at the optical path. In the period T3, the ND number of the imaging device 100 is ND4. The reception circuit 112 receives ND16 as the target ND number. In the period T4, the ND filter controller 114 drives the mechanical ND filter 140 to remove the ND filter 147 from the optical path. In the period T5, the ND number of the imaging device 100 is 0. That is, all the ND filters of the imaging device 100 are in the ineffective state. In the period T6, the ND filter controller 114 drives the mechanical ND filter 140 to arrange the ND filter 149 of ND16 at the optical path. In the period T7, the ND number of the imaging device 100 is ND16. Furthermore, if the reception circuit 112 receives ND64 as the target ND number, in the period T8, the ND filter controller 114 drives the mechanical ND filter 140 to arrange the ND filter 147 of ND4 at the optical path. In the period T9, the ND number of the imaging device 100 is ND64. If the reception circuit 112 receives a release of the ND filter, in the period T10, the ND filter controller 114 drives the mechanical ND filter 140 to remove the ND filter 147 and the ND filter 149 from the optical path. In the period T11, the ND filter 147, the ND filter 149, and the transparent glass 148 are not arranged at the optical path. In the period T12, the ND filter controller 114 drives the mechanical ND filter 140 to arrange the transparent glass 148 at the optical path. In the period T13, the ND number of the imaging device 100 is 0.

As described above, the ND number may be changed appropriately by varying the combination of the ND filter 147, the transparent glass 148, and/or the ND filter 149.

Figure 9:
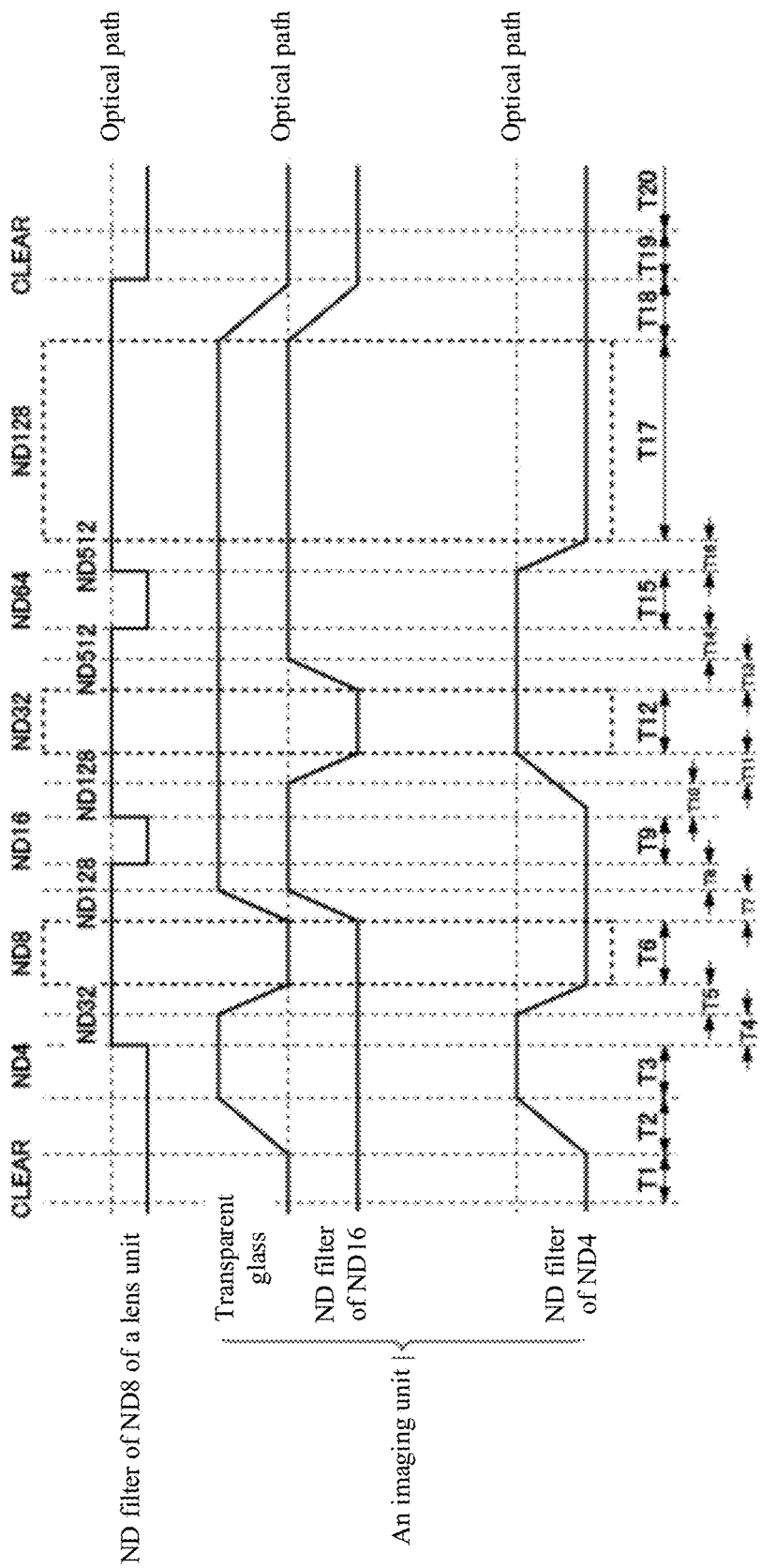
FIG. 9 is a schematic diagram showing an example of ND filter switch timing.

FIG. 9 is a schematic diagram showing an example of ND filter switch timing. In the period T1, the transparent glass 148 of the mechanical ND filter 140 is arranged at the optical path. If the reception circuit 112 receives ND4 as the target ND number, in the period T2, the ND filter controller 114 drives the mechanical ND filter 140 to arrange the ND filter 147 of ND4 at the optical path. In the period T3, the ND number of the imaging device 100 is ND4. If the reception circuit 112 receives ND8 as the target ND number, in the period T4, the ND filter controller 114 drives the magnetic ND filter 250 to arrange the ND filter of ND8 at the optical path when the ND filter 147 of ND4 is arranged at the optical path. Therefore, in the period T4, the ND number of the imaging device 100 temporarily becomes ND32. Then, in the period T5, the ND filter controller 114 drives the mechanical ND filter 140 to remove the ND filter 147 of ND4 from the optical path, and to arrange the transparent glass 148 at the optical path. Therefore, in the period T6, the ND number of the imaging device 100 is ND8.

Then, the reception circuit 112 receives ND16 as the target ND number. In the period T7, the ND filter controller 114 drives the mechanical ND filter 140 to remove the transparent glass 148 from the optical path, and to arrange the ND filter 149 of ND16 at the optical path. Therefore, in the period T8, the ND number of the imaging device 100 temporarily becomes ND128. In the period T8, the ND filter controller 114 drives the magnetic ND filter 250 to remove the ND filter of ND8 from the optical path. Therefore, the ND number of the imaging device 100 is ND16 in the period T9.

The reception circuit 112 receives ND32 as the target ND number. In the period T10, the ND filter controller 114 drives the magnetic ND filter 250 to arrange the ND filter of ND8 at the optical path. Therefore, in the period T10, the ND number of the imaging device 100 becomes ND128. Then, in the period T11, the ND filter controller 114 drives the mechanical ND filter 140 to remove the ND filter 149 of ND16 from the optical path, and to arrange the ND filter 147 of ND4 at the optical path. Therefore, in the period T12, the ND number of the imaging device 100 is ND32.

The reception circuit 112 receives ND64 as the target ND number. In the period T13, the ND filter controller 114 drives the mechanical ND filter 140 to arrange the ND filter 149 of ND16 at the optical path. In the period T14, the ND number of the imaging device 100 is ND512. In the period T15, the ND filter controller 114 drives the magnetic ND filter 250 to remove the ND filter of ND8 from the optical path. Therefore, the ND number of the imaging device 100 becomes ND64.

The reception circuit 112 receives ND128 as the target ND number. In the period T16, the ND filter controller 114 drives the magnetic ND filter 250 to arrange the ND filter of ND8 at the optical path. Furthermore, the ND filter controller 114 drives the mechanical ND filter 140 to remove the ND filter 147 of ND4 from the optical path. Therefore, in the period T17, the ND number of the imaging device 100 is ND128.

Then, if the reception circuit 112 receives an instruction to release all the ND filters, in the period T18, the ND filter controller 114 drives the mechanical ND filter 140 to remove the ND filter 149 of ND16 from the optical path, and to arrange the transparent glass 148 at the optical path. In the period T19, the ND filter controller 114 drives the magnetic ND filter 250 to remove the ND filter of ND8 from the optical path. Therefore, in the period T20, the ND number of the imaging device 100 is 0.

As described above, setting a higher ND number than the target ND number before setting the target ND number received by the reception circuit 112, for example, may reduce the sense of disobedience caused by the switching of the ND filters for the user who views the preview screen.

Figure 10:
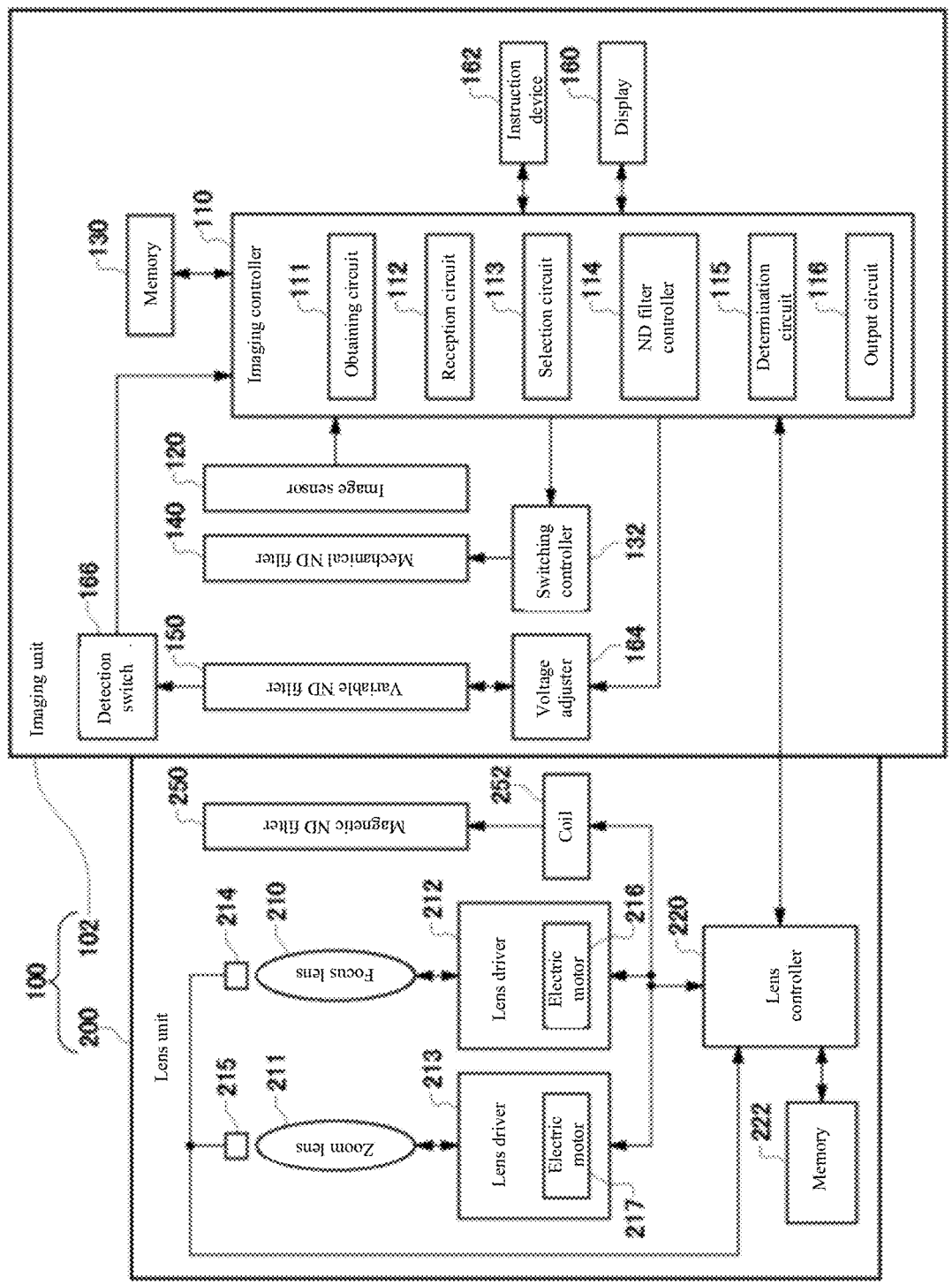
FIG. 10 is a schematic functional block diagram of an example imaging device.

FIG. 10 is a schematic functional block diagram of another example of imaging device 100. Different from the imaging device 100 shown in FIG. 2, the imaging device 100 shown in FIG. 10 includes a variable ND filter 150. The imaging device 100 in FIG. 10 further includes a voltage adjuster 164 and a detection switch 166. The voltage adjuster 164 adjusts a voltage applied to the variable ND filter 150 to change the transmittance of the ND filter included in the variable ND filter 150. The variable ND filter 150 includes, for example, a liquid crystal. The transmittance of the liquid crystal changes due to a change of the voltage applied to the liquid crystal, to change the ND number. The variable ND filter 150 may be detachably mounted at the casing of the imaging unit 102.

The detection switch 166 is a switch for detecting whether the variable ND filter 150 is mounted at the imaging unit 102. The detection switch 166 may be turned on when the variable ND filter 150 is mounted at the lens unit 200 or turned off when the variable ND filter 150 is not mounted at the lens unit 200. The detection switch 166 may be electrically connected to the lens unit 200 when the variable ND filter 150 is mounted at the lens unit 200, and electrically disconnected from the lens unit 200 when the variable ND filter 150 is not mounted at the lens unit 200. Then, the detection switch 166 can detect whether the variable ND filter 150 is mounted at the lens unit 200 according to whether the detection switch 166 is electrically connected to the lens unit 200.

Figure 11A:
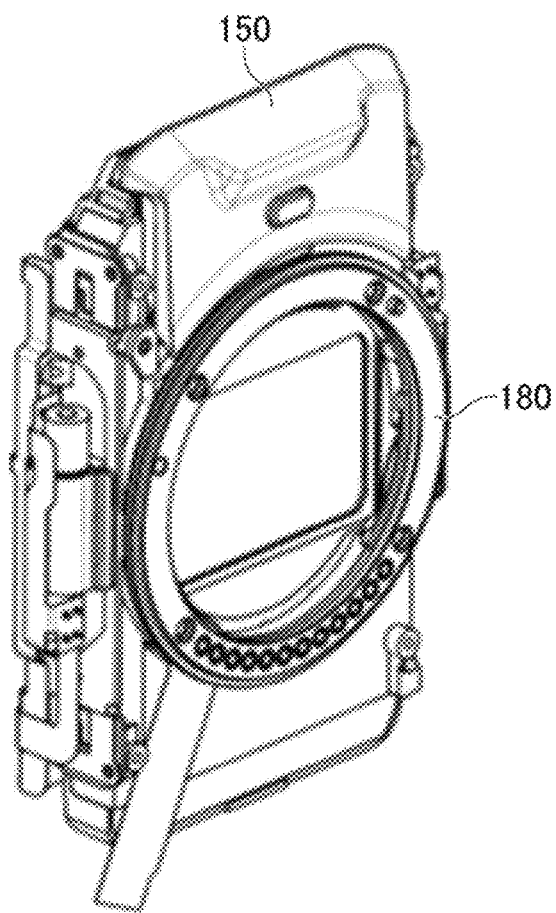
FIG. 11A is a schematic diagram of an example variable ND filter.
Figure 11B:
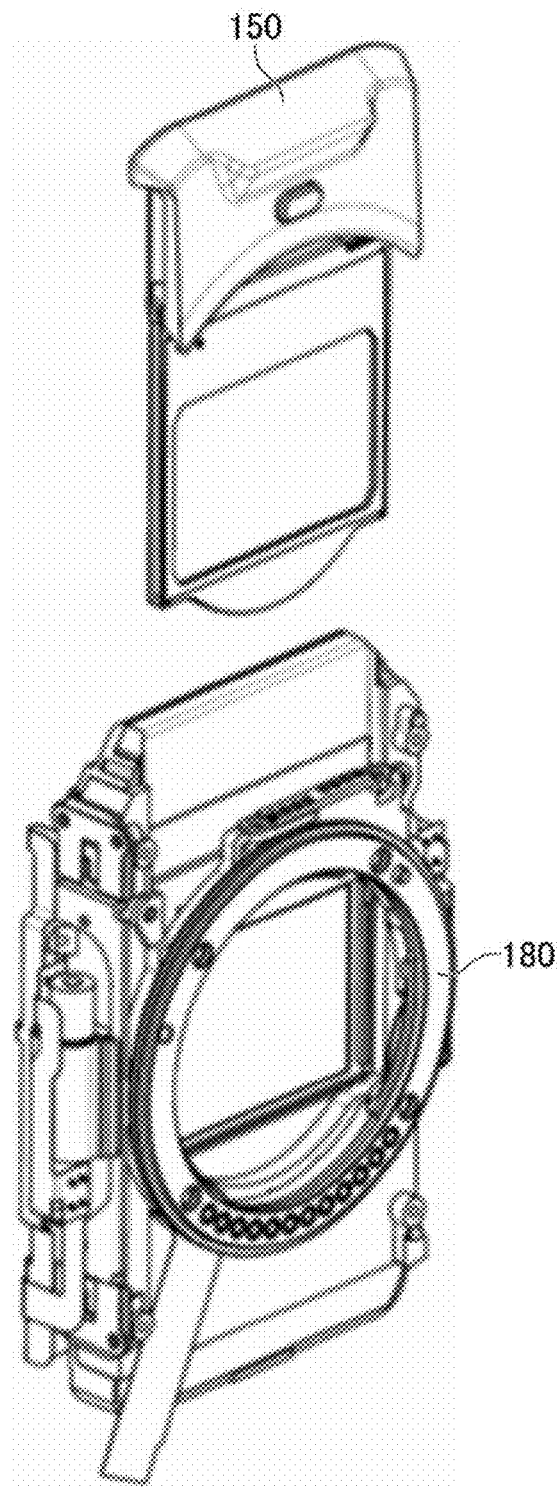
FIG. 11B is a schematic diagram of an example variable ND filter.

FIG. 11A shows a state in which the variable ND filter 150 is mounted at a rear of the lens mount opening 180 of the imaging unit 102. FIG. 11B shows a state in which the variable ND filter 150 is removed from the rear of the lens mount opening 180. Thus, the variable ND filter 150 may be detachably mounted at the imaging unit 102.

The ND filter controller 114 drives at least one of the mechanical ND filter 140, the variable ND filter 150, or the magnetic ND filter 250 to achieve the target ND number received by the reception circuit 112 according to the predetermined priority order.

Figures 12, 13:
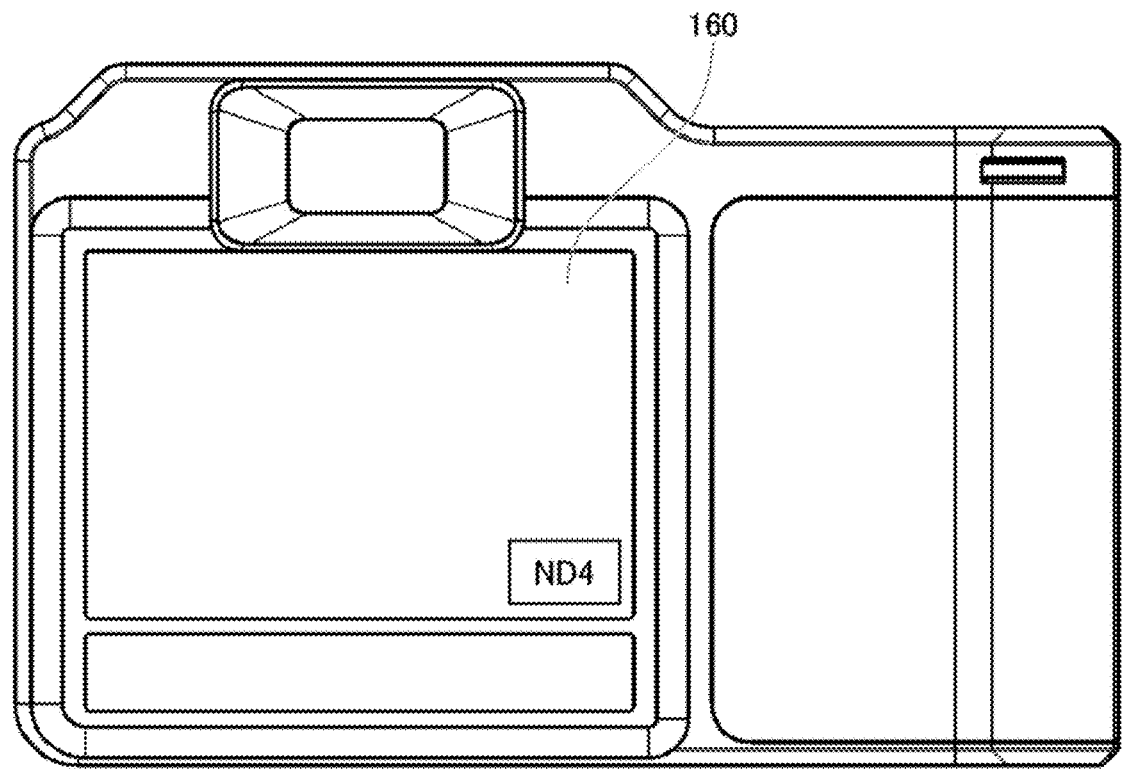
FIG. 12 shows a driving speed of an ND filter and a distance from an imaging surface.
FIG. 13 is a schematic diagram of an example display.

FIG. 12 shows a driving speed of an ND filter and a distance from an imaging surface. Parameters shown in FIG. 12 are used as a criterion for the selection of one of the mechanical ND filter 140, the variable ND filter 150, and the magnetic ND filter 250 by the selection circuit 113. The selection circuit 113 can select one of the mechanical ND filter 140, the variable ND filter 150, and the magnetic ND filter 250 according to the parameters shown in FIG. 12 and the predetermined priority order. The selection circuit 113 may select the magnetic ND filter 250, the variable ND filter 150, and the mechanical ND filter 140 in order according to a priority order of the driving speed. In addition, the selection circuit 113 may select the magnetic ND filter 250, the variable ND filter 150, and the mechanical ND filter 140 in order according to the priority order of the distance.

Prompting the user what ND number can be achieved of the imaging device 100 by the combination of the plurality of ND filters may improve the convenience of the user.

Therefore, the imaging controller 110 further includes a determination circuit 115 and an output circuit 116. The determination circuit 115 determines a combined ND number when the plurality of ND filters are in the effective state according to the information indicating the ND numbers of the plurality of ND filters included in the imaging device 100. For example, the imaging device 100 includes the magnetic ND filter 250 with the ND filter of ND8 and the mechanical ND filter 140 with the ND filter of ND4 and the ND filter of ND16. In this case, the determination circuit 115 determines that the ND number settable by the imaging device 100 is ND4, ND8, ND16, ND32, ND64, ND128, or ND512. The output circuit 116 outputs each ND number determined by the determination circuit 115 to prompt the user. The output circuit 116 may output each ND number determined by the determination circuit 115 to the display 160. The output circuit 116 may output each ND number determined by the determination circuit 115 by an audio.

Figure 14:
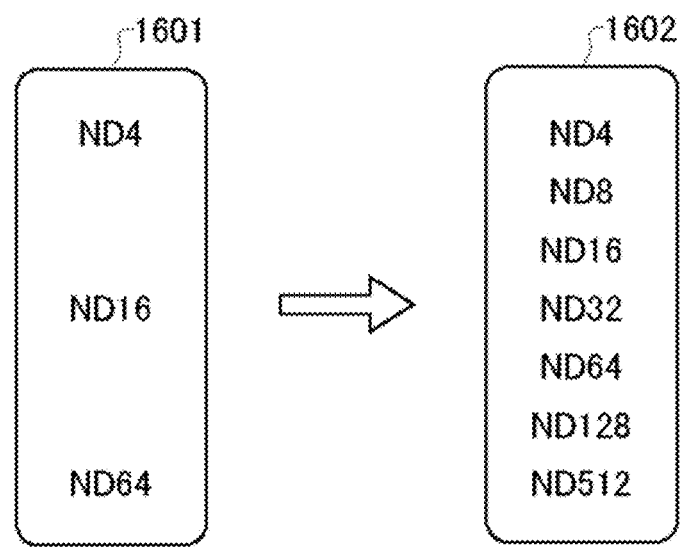
FIG. 14 is a schematic diagram showing a display example of a display.

FIG. 13 is a schematic diagram of an example display 160. FIG. 14 is a schematic diagram showing a display example of the display 160. As shown in FIG. 13, the display 160 displays a current target ND number. Each time the ND filter mounted at the imaging device 100 is changed, the determination circuit 115 may determine the ND number settable by the imaging device 100. As shown in FIG. 14, the display 160 displays the ND number settable by the imaging device 100 instead of the current target ND number.

Figure 15:
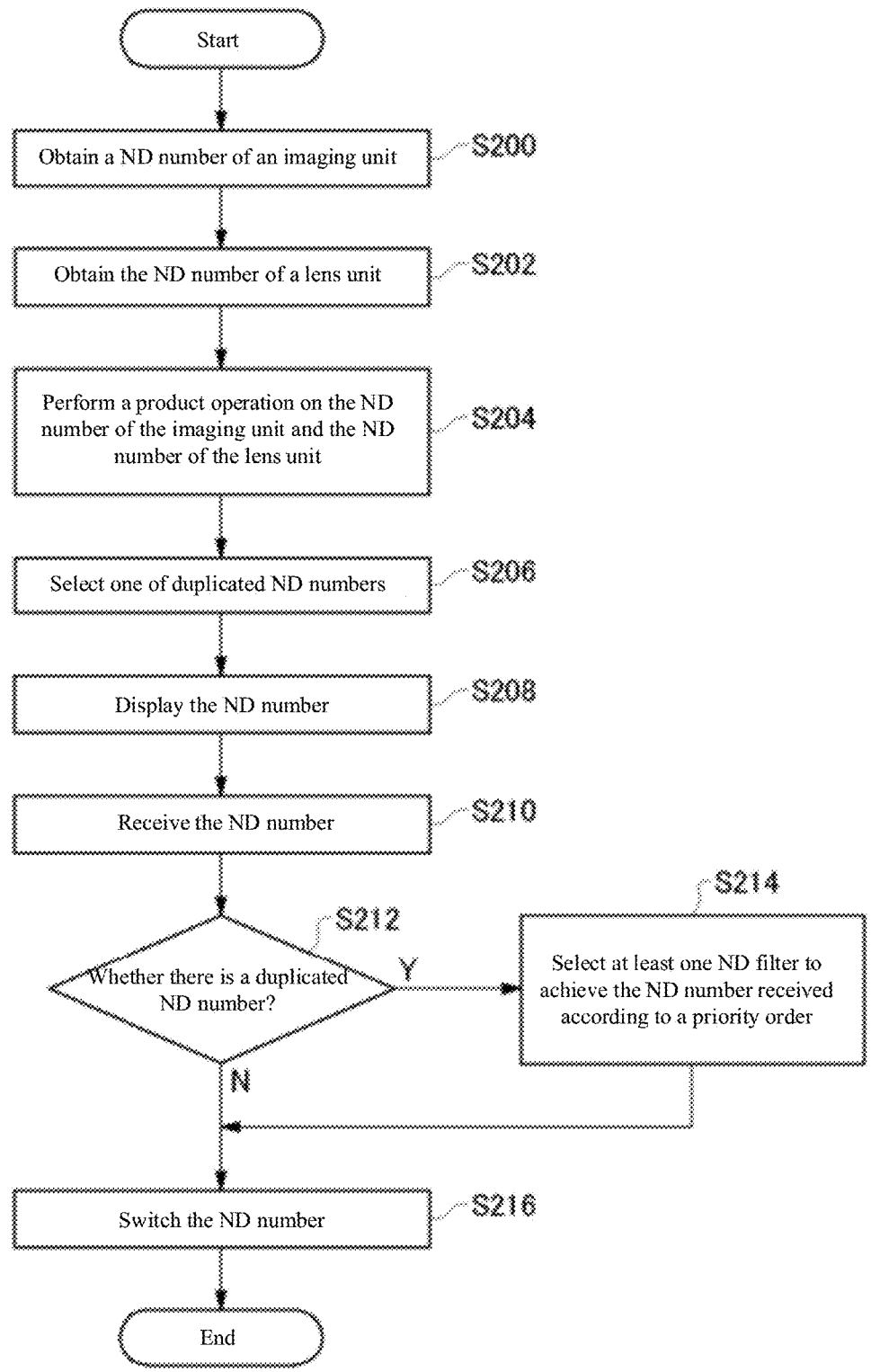
FIG. 15 is a schematic flow chart of a switching process of an ND filter according to an example embodiment.

FIG. 15 is a schematic flow chart of a switching process of an ND filter according to an example embodiment. The obtaining circuit 111 obtains the ND number settable by the ND filter of the imaging unit 102 from the memory 130 (S200). The obtaining circuit 111 obtains the ND number settable by the ND filter of the lens unit 200 from the memory 222 (S202). When the ND filter mounted at the imaging device 100 is of an adapter type, the obtaining circuit 111 may directly obtain the ND number of the ND filter from the memory of the ND filter.

The determination circuit 115 performs a product operation on each combination of each ND number settable by the imaging unit 102 and each ND number settable by the lens unit 200 (S204). Thus, the determination circuit 115 determines the ND numbers settable by the imaging device 100. The determination circuit 115 selects one ND number when there are duplicated ND numbers (S206). A duplicated ND number refers to an ND number that can be achieved by different combinations of the ND filters. The output circuit 116 enables the display 160 to display the ND number settable by the imaging device 100 determined by the determination circuit 115 (S208).

The reception circuit 112 receives the target ND number (S210). The selection circuit 113 determines whether the target ND number received is the duplicated ND number (S212). If the target ND number is the duplicated ND number, the selection circuit 113 selects the at least one ND filter to achieve the target ND number received according to the predetermined priority order (S214). The ND filter controller 114 arranges the at least one ND filter selected at the optical path to switch the ND number (S216).

As described above, presenting the user with a list of ND numbers settable by the imaging device 100 may improve the convenience of the user. In addition, when an ND number settable by the plurality of ND filters is duplicated, a more suitable ND filter is automatically selected according to the priority order according to the driving speed, the distance to the imaging surface that has a better optic effect, etc. Thereby, the convenience of the user to arrange the ND filter is improved.

Figure 16:
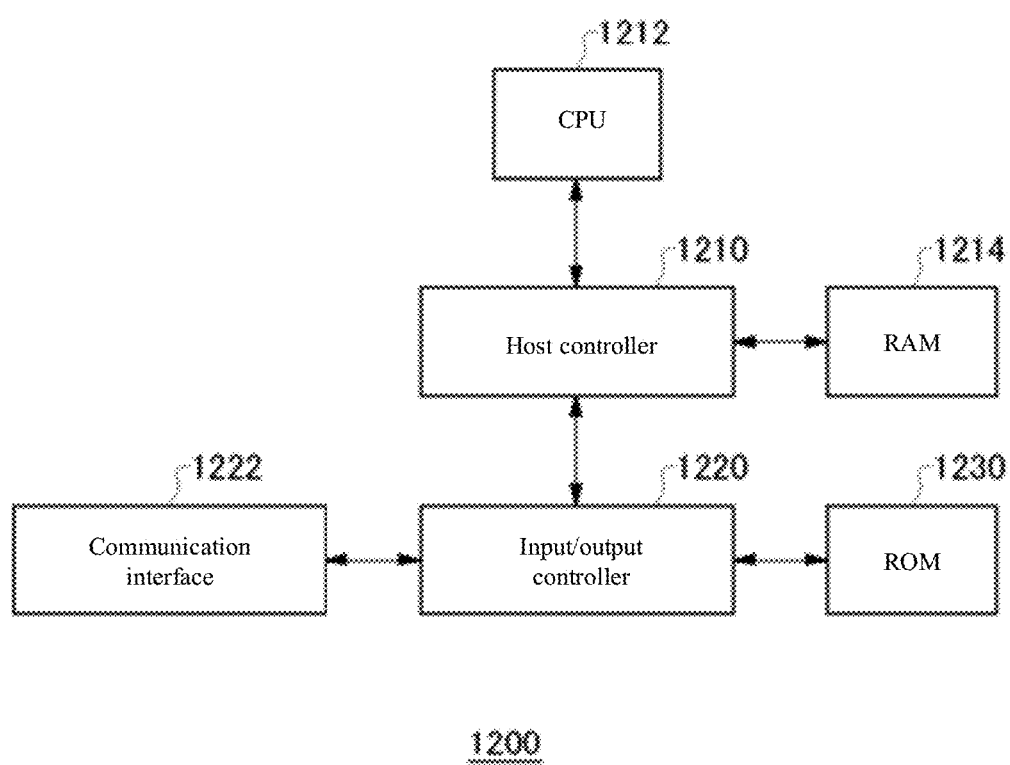
FIG. 16 is a schematic diagram of example hardware.

FIG. 16 is a schematic diagram of an example computer 1200 which may perform part or all of technical solutions consistent with the present disclosure. The program installed on the computer 1200 can enable the computer 1200 to function as operations associated with the device consistent with the embodiments of the present disclosure or one or more "components" of the device. Alternatively, the program may enable the computer 1200 to perform the operation or the one or more "components." The program enables the computer 1200 to execute the process or stages of the process consistent with the embodiments of the present disclosure. The program may be executed by a CPU 1212 to make the computer 1200 execute specified operations associated with some or all blocks in the flow chart and block diagram described in this specification.

In an example embodiment, the computer 1200 includes the CPU 1212 and a RAM 1214, which are connected to each other through a host controller 1210. The computer 1200 also includes a communication interface 1222 and an input/output unit, which are connected to the host controller 1210 through an input/output controller 1220. The computer 1200 also includes a ROM 1230. The CPU 1212 operates according to the programs stored in the ROM 1230 and the RAM 1214 to control each unit.

The communication interface 1222 communicates with another electronic device via a network. A hard disk drive may store programs and data used by the CPU 1212 of the computer 1200. The ROM 1230 therein stores a boot program executed by the computer 1200 during operation, and/or the program for hardware of the computer 1200. The program is provided via the network or the computer-readable storage medium, such as a CD-ROM, a USB memory, or an IC chip. The program is stored in the RAM 1214 or the ROM 1230, which are also examples of the computer-readable storage medium, and is executed by the CPU 1212. The information processing recorded in the programs is read by the computer 1200 to cause cooperation between the programs and various types of hardware resources described above. The apparatus or method may include operations or processing to implement information according to using of the computer 1200.

For example, when communication is performed between the computer 1200 and an external device, the CPU 1212 may execute a communication program loaded in the RAM 1214 and instruct the communication interface 1222 to perform communication processing according to the processing described in the communication program. The communication interface 1222 reads the transmission data stored in a transmission buffer provided in the storage medium such as the RAM 1214 or the USB memory under the control of the CPU 1212, and transmits read transmission data to the network or writes received data from the network into a reception buffer provided in the storage medium.

In addition, the CPU 1212 may enable the RAM 1214 to read files or all or required part of database stored in an external storage medium such as the USB memory, and perform various types of processing on data in the RAM 1214. Then, the CPU 1212 may write processed data back to the external storage medium.

Various types of information such as various types of programs, data, tables, and databases may be stored in the storage medium and be performed information processing on. For the data read from the RAM 1214, the CPU 1212 may perform various types of operations, information processing, conditional judgment, conditional transfer, unconditional transfer, and information retrieval/replacement specified by the instruction sequence of the program as described in various places in the disclosure, and write the result back to the RAM 1214. In addition, the CPU 1212 may retrieve information from files, databases, etc., in the storage medium. For example, when a plurality of entries of a first attribute that are associated with attribute values of a second attribute are stored in the recording medium, the CPU 1212 may retrieve the attribute value of a specified first attribute from the plurality of entries and read the attribute value of the second attribute stored in the entry to obtain the attribute value of the second attribute associated with the first attribute satisfying the predetermined condition.

The above-described programs or software modules may be stored in the computer 1200 or in the computer-readable storage medium near the computer 1200. In addition, the storage medium such as the hard disk or the RAM provided in a server system connected to a dedicated communication network or the Internet may be used as a computer-readable storage medium to cause the program to be provided to the computer 1200 via the network.

An execution order of the actions, sequences, processes, and stages in the devices, systems, programs, and methods consistent with claims, specification, and drawings, as long as there is no special indication "in front of," "before," etc., and as long as an output of previous processing is not used in the subsequent processing, may be implemented in any order. Regarding the operating procedures in the claims, the specification, and the drawings, terms "first," "next," etc. used in the descriptions for convenience, but do not limit an implementation order.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A control device comprising:
a memory storing instructions; and
a processor configured to execute the instructions to:
obtain transmittance information related to transmittances of a plurality of neutral-density filters of an imaging device;
receive a target transmittance;
determine a plurality of combinations each including at least one neutral-density filter of the plurality of neutral-density filters to achieve the target transmittance according to the transmittance information related to the transmittance of the at least one neutral-density filter;
select one combination of the plurality of combinations to achieve the target transmittance according to priority information related to a predetermined priority order of the plurality of neutral-density filters; and
control the at least one neutral-density filter included in the one combination to be in an effective state.

2. The control device of claim 1, wherein:
the imaging device includes:
a main body; and
a lens unit detachably held by the main body and including:
one or more of the plurality of neutral-density filters; and
a memory storing the transmittance information of the one or more of the plurality of neutral-density filters; and
the processor is further configured to execute the instructions to obtain the transmittance information of the one or more of the plurality of neutral-density filters from the memory.

3. The control device of claim 2, wherein:
the one or more of the plurality of neutral-density filters are first one or more of the plurality of neutral-density filter, and the memory is a first memory;
the main body includes:
second one or more of the plurality of neutral-density filters; and
a second memory storing the transmittance information of the second one or more of the plurality of neutral-density filters; and
the processor is further configured to execute the instructions to obtain the transmittance information of the second one or more of the plurality of neutral-density filters from the second memory.

4. The control device of claim 1, wherein the processor is further configured to execute the instructions to select one or more of the plurality of neutral-density filters having faster switching speeds than other ones of the plurality of neutral-density filters as the one combination to achieve the target transmittance according to the priority information.

5. The control device of claim 1, wherein the processor is further configured to execute the instructions to select one or more of the plurality of neutral-density filters as the one combination with a least number of neutral-density filters to achieve the target transmittance according to the priority information.

6. The control device of claim 1, wherein the processor is further configured to execute the instructions to select one or more of the plurality of neutral-density filters farther from an image sensor of the imaging device than other ones of the plurality of neutral-density filters as the one combination to achieve the target transmittance according to the priority information.

7. The control device of claim 1, wherein:
the plurality of neutral-density filters include a variable neutral-density filter having a variable transmittance; and
the processor is further configured to execute the instructions to select the variable neutral-density filter as the one combination to achieve the target transmittance according to the priority information.

8. The control device of claim 1, wherein the processor is further configured to execute the instructions to:
select at least another one neutral-density filter of the plurality of neutral-density filters to achieve a transmittance lower than the target transmittance according to the priority information and the transmittance information of the at least one neutral-density filter; and
control the at least another one neutral-density filter to be in the effective state and then control the at least one neutral-density filter included in the one combination to be in the effective state.

9. The control device of claim 1, wherein the processor is further configured to execute the instructions to:
determine combination transmittances of various combinations of the plurality of neutral-density filters according to the transmittance information of the plurality of neutral-density filters; and
output the combination transmittances.

10. The control device of claim 9, wherein the processor is further configured to execute the instructions to:
determine the transmittance corresponding to one of the plurality of neutral-density filters according to the transmittance information of the plurality of neutral-density;
determine the combination transmittance corresponding to the combination of multiple ones of the plurality of neutral-density filters according to the transmittance information of the plurality of neutral-density filters; and
output the transmittance corresponding to the one of the plurality of neutral density filters and the combination transmittance corresponding to the combination of multiple ones of the plurality of neutral-density filters.

11. An imaging device comprising:
a lens unit;
a main body configured to hold the lens unit; and
a control device including:
a memory storing instructions; and
a processor configured to execute the instructions to:
obtain transmittance information related to transmittances of a plurality of neutral-density filters of the imaging device;
receive a target transmittance;
determine a plurality of combinations each including at least one neutral-density filter of the plurality of neutral-density filters to achieve the target transmittance according to the transmittance information related to the transmittance of the at least one neutral-density filter;
select one combination of the plurality of combinations to achieve the target transmittance according to priority information related to a predetermined priority order of the plurality of neutral-density filters; and
control the at least one neutral-density filter included in the one combination to be in an effective state.

12. The imaging device of claim 11, wherein:
the lens unit includes:
one or more of the plurality of neutral-density filters; and
a memory storing the transmittance information of the one or more of the plurality of neutral-density filters; and
the processor is further configured to execute the instructions to obtain the transmittance information of the one or more of the plurality of neutral-density filters from the memory.

13. The imaging device of claim 12, wherein:
the one or more of the plurality of neutral-density filters are first one or more of the plurality of neutral-density filter, and the memory is a first memory;
the main body includes:
second one or more of the plurality of neutral-density filters; and
a second memory storing the transmittance information of the second one or more of the plurality of neutral-density filters; and
the processor is further configured to execute the instructions to obtain the transmittance information of the second one or more of the plurality of neutral-density filters from the second memory.

14. The imaging device of claim 11, wherein the processor is further configured to execute the instructions to select one or more of the plurality of neutral-density filters having faster switching speeds than other ones of the plurality of neutral-density filters as the one combination to achieve the target transmittance according to the priority information.

15. The imaging device of claim 11, wherein the processor is further configured to execute the instructions to select one or more of the plurality of neutral-density filters as the one combination with a least number of neutral-density filters to achieve the target transmittance according to the priority information.

16. The imaging device of claim 11, wherein the processor is further configured to execute the instructions to select one or more of the plurality of neutral-density filters farther from an image sensor of the imaging device than other ones of the plurality of neutral-density filters as the one combination to achieve the target transmittance according to the priority information.

17. The imaging device of claim 11, wherein:
the plurality of neutral-density filters include a variable neutral-density filter having a variable transmittance; and
the processor is further configured to execute the instructions to select the variable neutral-density filter as the one combination to achieve the target transmittance according to the priority information.

18. The imaging device of claim 11, wherein the processor is further configured to execute the instructions to:
select at least another one neutral-density filter of the plurality of neutral-density filters to achieve a transmittance lower than the target transmittance according to the priority information and the transmittance information of the at least one neutral-density filter; and
control the at least another one neutral-density filter to be in the effective state and then control the at least one neutral-density filter included in the one combination to be in the effective state.

19. The imaging device of claim 11, wherein the processor is further configured to execute the instructions to:
determine combination transmittances of various combinations of the plurality of neutral-density filters according to the transmittance information of the plurality of neutral-density filters; and
output the combination transmittances.

20. A control method comprising:
obtaining transmittance information related to transmittances of a plurality of neutral-density filters of an imaging device;
receiving a target transmittance;
determining a plurality of combinations each including at least one neutral-density filter of the plurality of neutral-density filters to achieve the target transmittance according to the transmittance information related to the transmittance of the at least one neutral-density filter;
selecting one combination of the plurality of combinations to achieve the target transmittance according to priority information related to a predetermined priority order of the plurality of neutral-density filters; and controlling the at least one neutral-density filter included in the one combination to be in an effective state.

* * * * *